June 23, 1942. R. HOWARD 2,287,309
COMBINED OVEN RACK AND DRIP CATCHER
Filed June 29, 1940
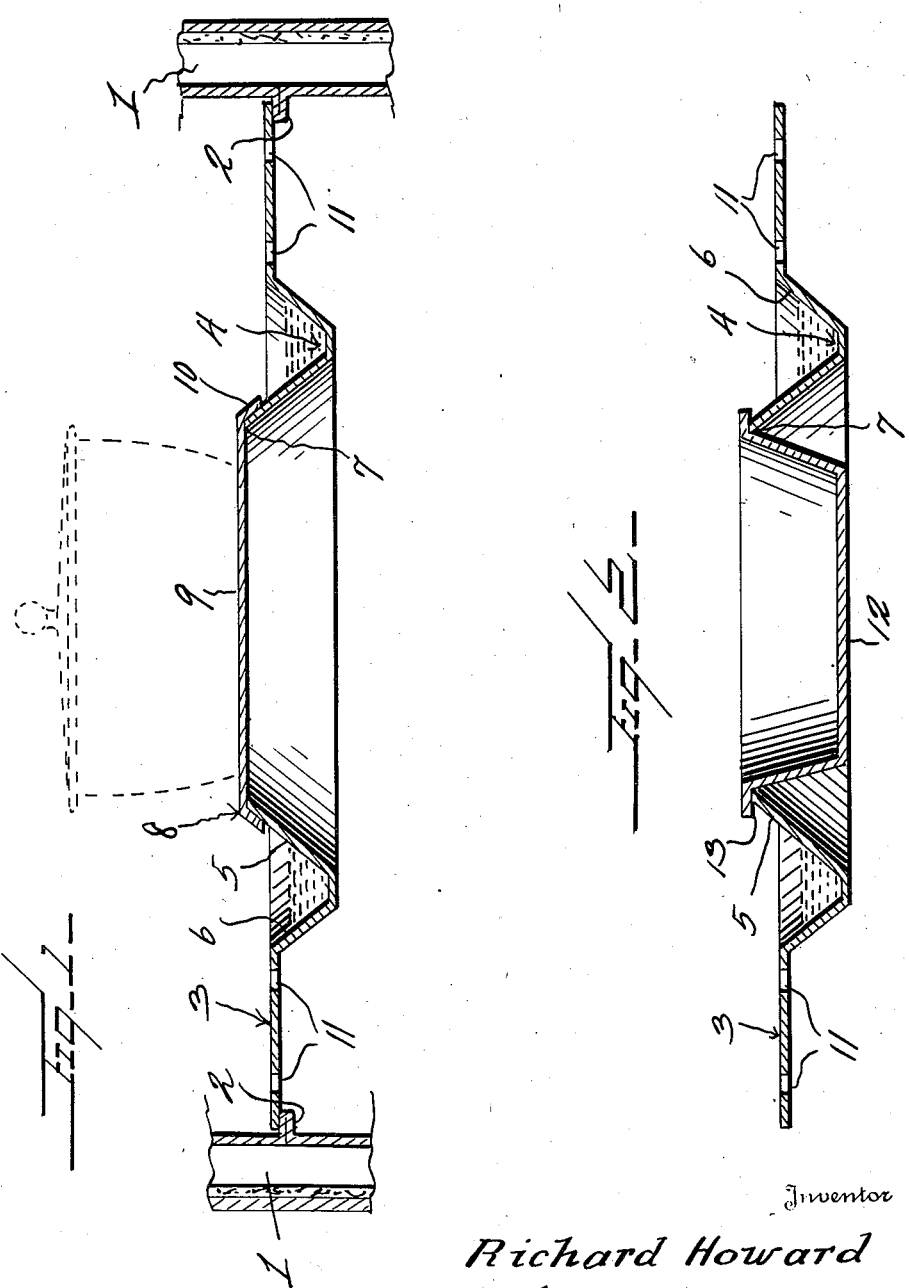
Inventor
Richard Howard
By Watson E. Coleman
Attorney Patented June 23, 1942

2,287,309

UNITED STATES PATENT OFFICE 2,287,309

COMBINED OVEN RACK AND DRIP CATCHER

Richard Howard, Los Angeles, Calif.

Application June 29, 1940, Serial No. 343,291

2 Claims. (Cl. 126—337)

This invention relates generally to cooking or baking devices and pertains especially to improvements in devices for use in the cooking of foods from which fluids may escape, for catching and retaining such fluids.

The primary object of the present invention is to provide an improved drip catcher device which is designed especially to be mounted within a stove oven and which is designed to support foods which are to be baked in the oven in such manner that any fluid which may escape from the food or from the pan in which the food is placed, will be caught and prevented from becoming burned, or from burning to any material extent, thereby not only preventing the interior of the oven from being soiled but preventing the development of smoke and gases.

A further object of the invention is to provide an improved stove oven rack drip catcher which is so designed that it may be employed for the support of baking receptacles having drip flanges so that fluid escaping from such receptacle over the flange will be caught in a water containing trough or it may be employed for the support of receptacles of other types, such receptacles being supported within the area defined by the water containing trough and the supporting means therefor being so constructed and arranged that any fluid escaping from the receptacles will be conveyed immediately into the water containing trough so that such fluids will not create any considerable amount of smoke from burning.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in transverse section through the stove ovenrack dripper embodying the present invention, showing the same mounted between the side walls of an oven.

Fig. 2 is a sectional view transversely through the device showing the use of the same for supporting a pan having a drip flange.

Referring now more particularly to the drawing, the numeral 1 designates portions of opposite sides of an oven structure in which are formed the usual supporting means 2 for engaging opposite edges of an oven rack upon which food is placed for baking. The stove ovenrack dripper or drip catcher embodying the present invention comprises a plate or flat body 3 of suitable material having a width sufficient to make it possible for the plate to be disposed horizontally in an oven with opposite edges engaging the supporting means 2. This plate is provided in its central portion with an annular receptacle 4 which is designed to receive water when the plate or rack is disposed within an oven. The inner and outer walls 5 and 6 respectively, of the receptacle are sloping as shown, diverging upwardly toward the plane of the plate and the inner wall is of slightly greater height than the outer wall 6 so that it terminates in a plane above the plane of the rack or plate.

At the center of the annular receptacle 4, there is formed the opening 7, the top edge of the inner wall 5 of the receptacle constituting the perimeter of the opening.

The numeral 8 designates a covering cap for the opening 7, which cap consists of the flat central or disk-like portion 9 and the encircling outwardly and downwardly directed flange 10. The angle of the flange 10 with respect to the plane of the body 8 corresponds to the angle of the inner wall 5 of the water receptacle with the plane of the rack or plate 3 and the diameter of the plate 9 is substantially the same as the diameter of the opening 7, so that when the cap 8 is placed in position over the opening, the flange 10 of the cap will fit against and lie parallel with the sloping inner wall 5 of the receptacle.

The plate or rack 3 is provided around the water receptacle 4 with a plurality of apertures 11. These apertures 11 provide for the circulation of heated air through the oven past the oven rack dripper when the latter is supported in the oven in the manner described. The ovenrack dripper embodying the invention may be employed either with or without the cap 8. For example, if there is to be employed a relatively large pan having sloping sides and a drip flange such as is indicated at 12, this may be placed directly within the opening 7 so as to be suspended therein in the manner illustrated, in which case the edge of the drip flange 13 of the pan will extend over the wall 5 and any drippings from the pan will pass directly into the water receptacle 4 and into the water contained therein. If a smaller pan or cooking dish is to be used such as is shown in Fig. 1, the cap 8 is placed on the dripper over the opening 7 and such receptacle or dish is then placed upon the cap and any drippings which may come from the dish will fall first upon the cap and then will pass immediately into the water contained in the receptacle 4. While there will be some slight burning of the drippings which fall upon the cap 8, this will not be as extensive or as continuous as would be the case if such drippings fell from the dish onto the floor of the oven where they would spread out and create a considerable amount of smoke and odor and in addition, would form a crust upon the floor of the oven which would be difficult to remove.

As will be readily appreciated, while the body 3 of the device has been described as being in the form of a plate or rack, it may be considered as constituting an extra wide perforated rim or flange for the annular receptacle, which rim or flange is suitably shaped and made of proper width to make it insertible into the oven in engagement at its opposite edges in the grooves or guides 2 in the oven walls.

From the foregoing, it will be readily appreciated that there is herein disclosed a novel ovenrack structure which may be employed in association with various types of cooking receptacles or dishes for catching drippings from such dishes or receptacles and preventing the same from becoming burned in the oven or from creating unpleasant odors and smoke.

What is claimed is:

1. A combined oven rack and drip catcher, comprising an annular receptacle having upwardly diverging inner and outer walls, a flat body connected with and extending laterally from the top edge of the outer wall and surrounding the receptacle and having a width sufficient for engagement at its opposite edges with oppositely disposed ovenrack supporting means, said inner wall extending to a height a substantial distance above the plane of said surrounding body, and a cover cap for the central opening of the receptacle adapted to rest upon the top edge of said inner wall and having a surrounding angularly extending flange directed into the receptacle and engaging against the top surface of the inner wall.

2. A combined oven rack and drip catcher, comprising an annular receptacle having upwardly diverging inner and outer walls, a flat body connected with and extending laterally from the top edge of the outer wall and surrounding the receptacle and having a width sufficient for engagement at its opposite edges with oppositely disposed oven rack supporting means, said inner wall extending to a height a substantial distance above the plane of said surrounding flat body, said flat body being provided with a plurality of openings therethrough for passage of heated air upwardly past the body, and a cover cap for the central opening of the receptacle adapted to rest upon the top edge of said inner wall and having a surrounding angularly extending flange directed into the receptacle and engaging against the top surface of the inner wall.

RICHARD HOWARD.